United States Patent [19]

Radovich et al.

[11] Patent Number: 4,569,952

[45] Date of Patent: Feb. 11, 1986

[54] FLEXIBLE POLYURETHANE FOAMS HAVING IMPROVED LOAD BEARING CHARACTERISTICS AND MIXTURES USEFUL THEREIN

[75] Inventors: David A. Radovich, Imperial; Alicia H. Keddie, Pittsburgh, both of Pa.

[73] Assignee: Mobay Chemical Corporation, Pittsburgh, Pa.

[21] Appl. No.: 696,942

[22] Filed: Jan. 31, 1985

Related U.S. Application Data

[63] Continuation-in-part of Ser. No. 606,493, May 3, 1984, abandoned.

[51] Int. Cl.$^4$ .................. C08G 18/14; C08G 18/32; C08G 18/50
[52] U.S. Cl. ............................. 521/167; 252/182
[58] Field of Search ............... 521/99, 167; 252/182

[56] References Cited

U.S. PATENT DOCUMENTS

| | | | |
|---|---|---|---|
| 3,067,148 | 12/1962 | Sandridge et al. | 260/2.5 |
| 3,336,245 | 8/1967 | Britain | 521/167 |
| 3,423,344 | 1/1969 | Odinak et al. | 521/167 |
| 3,493,525 | 2/1970 | Britain | 521/167 |
| 3,499,009 | 3/1970 | Odinak et al. | 521/167 |
| 3,597,371 | 8/1971 | Britain | 521/167 |
| 3,948,825 | 4/1976 | Pray | 260/2.5 AQ |
| 4,042,537 | 8/1977 | Dahm et al. | 260/2.5 AP |
| 4,089,835 | 5/1978 | König et al. | 260/31.6 |
| 4,243,759 | 1/1981 | Haas | 521/167 |
| 4,469,822 | 9/1984 | Stolz et al. | 521/167 |

*Primary Examiner*—Herbert S. Cockeram
*Attorney, Agent, or Firm*—Gene Harsh; Joseph C. Gil

[57] ABSTRACT

The present invention is directed to a process for the production of a flexible polyurethane foam comprising reacting an organic polyisocyanate and a polyol, in the presence of a blowing agent, a catalyst, and a foam stabilizer, the improvement wherein a foam of increased load bearing is obtained by including in the reaction mixture from about 8 to about 25 parts by weight per 100 parts by weight of said polyol of a mixture comprising (a) from 30 to 100 percent by weight of an addition product of an alkylene oxide and an aromatic diamine, said addition product having an average hydroxyl functionality of at least 2.5 and as high as 6, and having an hydroxyl number of from about 150 to about 810 and containing no free amine hydrogen, and (b) from 0 to 70 percent by weight of an alkanolamine having at least one hydroxyl group and having at least two active hydrogens, wherein the hydroxyl number of the combination of the polyol, the mixture, and any other isocyanate-reactive components, excluding water, is from 25 to 300, said process further being characterized as being conducted in the absence of a tin catalyst.

11 Claims, No Drawings

FLEXIBLE POLYURETHANE FOAMS HAVING IMPROVED LOAD BEARING CHARACTERISTICS AND MIXTURES USEFUL THEREIN

CROSS REFERENCE TO RELATED APPLICATION

The present application is a continuation-in-part of U.S. application Ser. No. 606,493, filed on May 3, 1984, abandoned.

BACKGROUND OF THE INVENTION

Flexible polyurethane foams are generally prepared by reacting an organic polyisocyanate and a polyol in the presence of a blowing agent, a catalyst, and a foam stabilizer. Typical polyols used in the art include polyether polyols prepared by alkoxylating an hydroxy-functional initiator. While foams prepared from these polyols are satisfactory for many applications, such foams may not be firm enough for several applications. Firmer foams can be produced by using polymer polyols prepared by polymerizing one or more ethylenically unsaturated monomers in a polyether polyol; dispersions of polyureas and/or polyhydrazodicarbonamides in hydroxyl group containing materials (see e.g. U.S. Pat. Nos. 4,042,537 and 4,089,835); higher functionality initiators, short chain crosslinkers (see, e.g. U.S. Pat. Nos. 3,067,148 and 3,948,825) and/or fillers. However, these solutions lead to other deficiencies such as processing difficulties.

DESCRIPTION OF THE INVENTION

The present invention is directed to the discovery that addition of specific additives leads to flexible polyurethane foams having significantly enhanced load bearing properties. More particularly, the present invention is directed to a process for the production of a flexible polyurethane foam having improved load bearing characteristics and to the foams so produced. The present process broadly comprises reacting an organic polyisocyanate and a polyol in the presence of a blowing agent, a catalyst and a foam stabilizer wherein from about 8 to about 25 parts by weight, based on 100 parts of the polyol, of the specific additive of the present invention is added to the reaction mixture. The additive of the present invention broadly comprises:

(a) from 30 to 100 percent by weight of an addition product of an alkylene oxide and an aromatic amine, wherein the addition product contains no free amine hydrogens, and wherein the addition product has an average hydroxyl functionality of at least 2.5 and no higher than 6, and has an hydroxyl number of from about 150 to about 810, and (b) from 0 to 70 percent by weight of an alkanolamine having at least one hydroxyl group and at least two active hydrogens. The process of the present invention is also characterized by being conducted in the absence of a tin catalyst. It is also essential in preparing the flexible foam of the present invention that the hydroxyl number of the mixture of the polyol, the additive and any other isocyanate-reactive materials present (excluding water) be in the range of from 25 to 300, preferably from 25 to 200, and most preferably from about 60 to about 160.

The present invention is also directed to a blend comprising (a) an organic polyol, (b) from 30 to 100 percent by weight of an addition product of an alkylene oxide and an aromatic amine, wherein the addition product contains no free amine hydrogens, and wherein the addition product has an average hydroxyl functionality of at least 2.5 and no higher than 6, and has an hydroxyl number of from about 150 to about 810, and (c) from 0 to 70 percent by weight of an alkanolamine having at least one hydroxyl group and at least two active hydrogens, wherein the hydroxyl number of said blend is from 25 to 300 and preferably from 25 to 200, and most preferably from about 60 to 160.

In producing the flexible foams herein, substantially any organic compound containing more than two hydroxyl groups can be used as the polyol component. Such compounds generally have molecular weights of from about 500 to about 12,000, preferably from about 1,000 to about 8,000, and most preferably from about 1,500 to about 7,000. The functionality of the hydroxyl group containing compound is generally in excess of 2 and preferably has an average functionality of from 2.5 to no more than 4. Preferred compounds include polyesters, polyethers, polythioethers, polyacetals, polycarbonates and polyester amides containing an average of more than 2, and preferably from 2.5 to 4 hydroxyl groups.

Polyesters containing hydroxyl groups suitable for the present invention are reaction products of polyhydric alcohols with polybasic carboxylic acids. Instead of using the free polycarboxylic acids, it is also possible to use the corresponding polycarboxylic acid anhydrides or corresponding polycarboxylic acid esters of lower alcohols or mixtures thereof to produce the polyesters. The polycarboxylic acids may be aliphatic, cycloaliphatic, aromatic and/or heterocyclic and may optionally be substituted (for example by halogen atoms) and/or may be unsaturated.

Examples of suitable carboxylic acids and derivatives thereof are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrahydrophthalic acid anhydride, glutaric acid anhydride, maleic acid, maleic acid anhydride, fumaric acid, dimerized and trimerized unsaturated fatty acids (optionally in admixture with monomeric unsaturated fatty acids, such as oleic acid) terephthalic acid dimethylester and terephthalic acid-bis-glycol ester. Suitable polyhydric alcohols include: ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl-cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones (for example ε-caprolactone) or of hydroxy carboxylic acids (for example, ω-hydroxy caproic acid) may also be used.

The polyethers suitable for use in accordance with the present invention are known to those in the art. These polyethers may be obtained by polymerizing epoxides, such as ethylene oxide, propylene oxide, butylene oxide, tetrahydrofuran, styrene oxide, or epichlorohydrin in the presence of Lewis catalysts, such as $BF_3$. Polymerization may also be accomplished by the addition of epoxides (preferably ethylene oxide and propylene oxide) either in admixture or successively, to compounds containing reactive hydrogen atoms such as water, ammonia, alcohols or amines. Examples of such reactive hydrogen-containing compounds are ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyethers of the type described in German Auslegeschriften Nos. 1,176,358 and 1,064,938 and formitol or formose-started polyethers (German Offenlegungsschriften Nos. 2,639,083 and 2,737,951) may also be used in accordance with the present invention. In most cases, it is preferred to use polyethers which contain predominantly primary OH-groups (up to 90% by weight, based on all the OH-groups present in the polyether). Polybutadienes containing OH-groups are also suitable to the present invention.

Among the polythioethers which may be employed as the high molecular weight isocyanate reactive compounds, the condensation products of thiodiglycol on its own and/or with other glycols, dicarboxylic acids, formaldehyde, aminocarboxylic acids or amino alcohols are preferred. These condensation products include polythio mixed ethers, polythioether esters or polythioether ester amides.

Polyacetals which may be used in the present invention include the compounds obtained by reacting glycols (such as diethylene glycol, triethylene glycol, 4,4'-dioxethoxy diphenyl dimethyl methane and hexane diol) with formaldehyde. Other polyacetals suitable to the present invention may be obtained by polymerizing cyclic acetals, such as trioxane (German Offenlegungsschrift No. 1,694,128).

Suitable polycarbonates containing hydroxyl groups are known to those in the art. Such polycarbonates may be obtained by reacting diols (such as 1,3-propane diol, 1,4-butane diol and/or 1,6-hexane diol, diethylene glycol, triethylene glycol, tetraethylene glycol or thiodiglycol) with diaryl carbonates (for example diphenyl carbonate) or with phosgene (German Auslegeschriften Nos. 1,694,080; 1,915,908 and 2,221,751; German Offenlegungsscrhift No. 2,605,024).

The polyester amides and polyamides suitable to the present invention include the predominantly linear condensates obtained from polybasic carboxylic acids or anhydrides thereof and polyhydric amino alcohols, diamines, higher polyamines and mixtures thereof.

Polyhydroxyl compounds containing urethane or urea groups, optionally modified natural polyols (such as castor oil), and carbohydrates (for example starch), may also be used as the isocyanate reactive compound of the present invention. Addition products of alkylene oxides with phenol/formaldehyde resins or with urea/formaldehyde resins may also be used.

The above-mentioned polyhydroxyl compounds may be modified in various ways. One such modification (described in German Offenlegungsschriften Nos. 2,210,839 (U.S. Pat. No. 3,849,515) and 2,544,195) is accomplished by etherification of a mixture of different polyhydroxyl compounds (for example, a polyether polyol and a polyester polyol) in the presence of a strong acid to form a relatively high molecular weight polyol which is made up of different segments attached through ether and ester bridges. Amide groups may be introduced into the polyhydroxyl compounds by the procedure disclosed in German Offenlegungsschrift No. 2,559,372. Triazine groups may be introduced in the polyhydroxyl compounds by reacting the polyhydroxyl compounds with polyfunctional cyanic acid esters (German Offenlegungsschrift No. 2,620,487). The reaction of a polyol with a less than equivalent quantity of a diisocyanato-carbodiimide, followed by reaction of the carbodiimide group with an amine, amide, phosphite or carboxylic acid, gives polyhydroxyl compounds containing guanidine, phosphonoformamide or acyl urea groups (German Offenlegungsschriften Nos. 2,714,289; 2,714,292 and 2,714,293).

According to the present invention, it is also possible to use polyhydroxyl compounds containing high molecular weight polyadducts and polycondensates or polymers in finely dispersed or dissolved form. Such polyhydroxyl compounds may be obtained by polyaddition reactions (for example, reactions between polyisocyanates and aminofunctional compounds), and polycondensation reactions (for example, between formaldehyde and phenols and/or amines) in situ in the above-mentioned compounds containing hydroxyl groups. Such processes are described in German Auslegeschriften Nos. 1,168,075; 1,260,142; and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible to obtain such a polyhydroxyl compound by mixing an aqueous polymer dispersion with a polyhydroxyl compound and subsequently removing the water from the mixture (U.S. Pat. No. 3,869,413 or German Offenlegungsschrift No. 2,550,860).

In one preferred embodiment of the present invention, the polyol is a dispersion of a polyurea and/or polyhydrazodicarbonamide in an organic compound containing at least two hydroxyl groups. These dispersions are known in the art, are commercially available, and have been described, e.g. in U.S. Pat. Nos. 3,325,421; 4,042,537; 4,089,835; 4,293,470; 4,296,213 and 4,374,209, the disclosures of which are herein incorporated by reference. In general, the dispersions useful herein are produced by reacting monofunctional, bifunctional or higher functional isocyanates with (a) polyamines containing primary and/or secondary amino groups and/or (b) hydrazines and/or hydrazides, in the presence of an organic compound which contains at least two hydroxyl groups. As is known and as described in the above-noted U.S. patents, such dispersions can be produced having a wide range of solids contents. In general, the solids content of the dispersion itself will range from 1 to as high as 40 percent, and preferably from 5 to 40 percent by weight. In general it is preferred that such dispersions contain high levels of primary hydroxyl groups.

Also preferred are the so-called polymer polyols which are prepared by polymerizing one or more ethylenically unsaturated monomers in a relatively high molecular weight organic compound containing at least two hydroxyl groups (U.S. Pat. Nos. 3,383,351; 3,304,273; 3,523,093 and 3,110,695; German Auslegeschrift No. 1,152,536) or polycarbonate polyols (German Patent No. 1,769,795; U.S. Pat. No. 3,637,909) are also suitable for use in the process according to the present invention. Plastics having particularly low combustibility are obtained by using polyether polyols modified by graft polymerization with vinyl phosphonic acid esters and, optionally, (meth-)acrylonitrile, (meth-)acrylamide or OH-functional (meth-)acrylic acid esters (German Offenlegungsschriften Nos. 2,442,101; 2,644,922 and 2,646,141). Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) are particularly advantageous when used in combination with mineral fillers.

The polymer polyols noted above and useful herein are known and are commercially available. Typical preparations of such polyols are disclosed in U.S. Pat. Nos. Re. 28,715 and 29,118, the disclosures of which are herein incorporated by reference. Polymer polyols are available commercially from such companies as Bayer AG, Union Carbide and BASF.

The following Table 1 lists suitable commercially available Niax polymer polyols from Union Carbide. It is presently preferred to use those polymer polyols which contain primary hydroxyl groups.

TABLE 1

| | Viscosity at 25° C. Centipoises | Apparent Specific Gravity at 20/20° C. | Hydroxyl Number | Polyacrylonitrile, % by wt. | Polystyrene, % by wt. | Molecular Weight Base Polyol | Functionality Base Polyol | OH Group Type |
|---|---|---|---|---|---|---|---|---|
| 34-45 | 1267 | 1.027 | 45.0 | 9.9 | 8.1 | 3000 | 3 | Secondary |
| 34-37 | 1563 | 1.037 | 36.8 | 9.0 | 9.0 | 3600 | 3 | Secondary |
| 37-36 | 1771 | 1.057 | 34.8 | 7.2 | 10.8 | 3800 | 3 | Secondary |
| 24-32 | 1211 | 1.036 | 32.0 | 10.0 | 10.0 | 2800 | 2 | Primary |
| 31-28 | 3000 | 1.050 | 28.0 | 21.0 | — | 5000 | 3 | Primary |
| 34-28 | 1958 | 1.043 | 28.0 | 10.9 | 10.1 | 5000 | 3 | Primary |
| 32-10 | 1200 | 1.030 | 32.5 | 4.4 | 4.0 | 5000 | 3 | Primary |
| 32-33 | 994 | 1.034 | 34.0 | 4.2 | — | 5000 | 3 | Primary |
| 35-25 | 3000 | 1.056 | 25.6 | 21.6 | 6.4 | 5000 | 3 | Primary |
| 39-36 | 2900 | 1.057 | 35.5 | 26.1 | 7.4 | 3100 | | |

Where modified polyhydroxyl compounds of the type mentioned above are used as starting components in the polyisocyanate-polyaddition process, polyurethanes having considerably improved mechanical properties are generally obtained.

Representatives of the above-mentioned polyols suitable to the present invention are described in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5-6 and 198-199, and in Kunststoff-Handbuch, Vol. VII, Vieweg-Hochtlen, Carl-Hanser-Verlag, Munich, 1966, for example on pages 45 to 71. It is, of course, possible to use mixtures of the above-mentioned compounds.

In producing the flexible foams of the present invention, substantially any organic polyisocyanate may be used. Aliphatic, cycloaliphatic, araliphatic, aromatic and heterocyclic polyisocyanates may be used. Examples of suitable polyisocyanates are described by W. Siefken in Justus Liebigs Annalen der Chemie, 562, pages 75 to 136. Among the polyisocyanates described therein are those corresponding to the general formula

wherein
  n represents 2–4, preferably 2; and
  Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms; or an araliphatic hydrocarbon radical containing from 8 to 15 (preferably from 8 to 13) carbon atoms.

Examples of compounds corresponding to this formula are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanato-methyl cyclohexane (German Auslegeschrift No. 1,202,785, U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate.

Other examples of suitable polyisocyanates are: triphenyl methane-4,4',4"-triisocyanate, polyphenyl polymethylene polyisocyanates of the type obtained by condensing aniline with formaldehyde followed by phosgenation (described in British Pat. Nos. 874,430 and 848,671); m- and p-isocyanatophenyl sulfonyl isocyanates (U.S. Pat. No. 3,277,138); polyisocyanates containing carbodiimide groups (German Pat. No. 1,092,007 (U.S. Pat. No. 3,152,162) and German Offenlegungsschriften Nos. 2,504,400; 2,537,685 and 2,552,350)); norbornane diisocyanates (U.S. Pat. No. 3,492,330); polyisocyanates containing allophanate groups (British Pat. No. 994,890, Belgian Pat. No. 761,626 and Dutch Patent Application No. 7,102,524); polyisocyanates containing isocyanurate groups (U.S. Pat. No. 3,001,973); German Pat. Nos. 1,022,789; 1,222,067 and 1,027,394 and German Offenlegungsschriften Nos. 1,929,034 and 2,004,048); polyisocyanates containing urethane groups (Belgian Pat. No. 752,261, U.S. Pat. Nos. 3,394,164 and 3,644,457); polyisocyanates containing acylated urea groups (German Pat. No. 1,230,778); polyisocyanates containing biuret groups (U.S. Pat. Nos. 3,124,605 and 3,201,372, British Pat. No. 889,050); polyisocyanates produced by telomerization reactions (U.S. Pat. No. 3,654,106); polyisocyanates containing ester groups (British Pat. Nos. 965,474 and 1,072,956, U.S. Pat. Nos. 3,567,763 and German Pat. No. 1,231,688); reaction products of the above-mentioned diisocyanates with acetals (German Pat. No. 1,072,385) and polyisocyanates containing polymeric fatty acid esters (U.S. Pat. No. 3,455,883). It is also possible to use the isocyanate group-containing distillation residues obtained in the commercial production of isocyanates, optionally in solution in one or more of the above-mentioned polyisocyanates. It is also possible to use mixtures of the above-mentioned polyisocyanates.

It is generally preferred that the commercially available polyisocyanates be used in the present invention. Such readily available materials include 2,4- and 2,6-tolylene diisocyanate, also mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

As noted above, the present invention is directed to the discovery that certain specified additives significantly enhance the load bearing characteristics of flexible polyurethane foams. The additive(s) are generally added to the polyol component in an amount of from about 8 to about 25 parts by weight, and preferably from 10 to 20 parts by weight, based on 100 parts by weight of the polyol.

The essential additive of the present invention is an addition product of an alkylene oxide and an aromatic amine. The addition product contains no free amine hydrogens and has an hydroxyl number of from about 150 to about 810 and an average hydroxyl functionality of from 2.5 to 6. The addition product preferably has an average hydroxyl functionality of from 2.5 to 4 and an hydroxyl number of from about 350 to about 600. The addition product is prepared by reacting an aromatic amine with an alkylene oxide. Suitable alkylene oxides include ethylene oxide, propylene oxide, butylene oxide, styrene oxide and the like. Ethylene oxide and propylene oxide are preferred. Suitable aromatic diamines include 2,4- and 2,6-toluene diamine and mixtures thereof; 2,4'- and 4,4'-methylene-bis(phenylene diamine) and mixtures thereof; phenylene diamines; and the like. If desired, prior to the reaction, a low molecular weight hydroxyl functional material may be added to the diamine to lower or increase the average hydroxyl functionality. Suitable low molecular weight hydroxyl functional materials include ethylene glycol, propylene glycol, glycerol, trimethylol propane, pentaerythritol, sorbitol, sucrose and the like.

The second additive of the present invention is an alkanol amine having at least two active hydrogens and at least one hydroxyl group. Useful amines include alkanolamines selected from the group consisting of alkanolamines having the formulae:

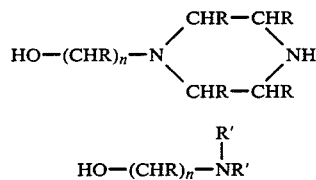

wherein R is selected from the group consisting of hydrogen and $C_1$-$C_4$ alkyl, R' is selected from the group consisting of hydrogen, $C_1$-$C_4$ alkyl and $(CHR)_n$ OH, and n is a positive integer having a value of two to five. Examples of suitable alkanolamines that may be used include monoethanolamine, diethanolamine, isopropanolamine, propanolamine, dipropanolamine, diisopropanolamine, triethanolamine, triisopropanolamine, 2-amino-1-butanol, N-hydroxyethylbutylamine, hydroxyethylpiperazine, N-hydroxybutylamine, N-hydroxyethyl-2,5-dimethyl-piperazine and the like. Mixtures can also be used.

The relative amounts of the addition product and alkanolamine can vary over a wide range. In general from 30 to 100% by weight of the additive mixture is the addition product while the alkanolamine constitutes the balance (i.e., from 0 to 70%). It is preferred that the addition product to alkanolamine weight ratio be from 10:1 to 1:2, and preferably from 5:1 to 1:1 and most preferably about 2.2:1.

In preparing the foams of the present invention, the polyol and additive(s) are reacted with an organic polyisocyanate in the presence of a blowing agent, a catalyst and a foam stabilizer. In order to prepare "flexible" foams as that term is recognized in the art, it is essential that the hydroxyl number of the mixture of polyol, additive, and any other isocyanate-reactive materials, excluding water, present be from 25 to 300, preferably from 25 to 200, and most preferably from about 60 to about 160.

Suitable blowing agents include water and/or readily volatile inorganic or organic substances. Appropriate organic blowing agents are acetone, ethyl acetate, halogen-substituted alkanes, such as methylene chloride, chloroform, ethylidene chloride, vinylidene chloride, monofluorotrichloromethane; chlorodifluoromethane, dichlorodifluoromethane; and butane, hexane, heptane or diethyl ethers. Inorganic blowing agents which may be used are air, $CO_2$ and $N_2O$. A blowing effect may also be achieved by adding compounds which decompose at the reaction temperature to give off a gas (e.g., nitrogen, given off by azo compounds, such as azodicarbonamide or azobutyronitrile). Other examples of blowing agents and information on the use of blowing agents may be found in Kunststoff-Handbuch, Vol. VII, by Vieweg and Hochtlen, Carl-Hanser-Verlag, Munich, 1966, for example on pages 108 and 109, 453 to 455 and 507 to 510.

Catalysts known in the art are also used in the practice of the present invention. Among these catalysts are tertiary amines such as triethylamine; tributylamine; N-methyl morpholine; morpholine; N,N,N', N'-tetramethyl ethylene diamine; pentamethyl diethylene triamine and higher homologues (German Offenlegungsschriften Nos. 2,624,527 and 2,624,528); 1,4-diazabicyclo-(2,2,2)-octane; N-methyl-N'-dimethylamino-methyl piperidine; bis(dimethylaminoalkyl)-piperazines (German Offenlegungsschrift No. 2,636,787); N,N-dimethyl benzylamine; N,N-dimethyl cyclohexylamine; N,N-diethyl benzylamine; bis(N,N-diethylaminoethyl)-adipate; N,N,N',N'-tetramethyl-1,3-butane diamine; N,N-dimethyl-$\beta$-phenylethylamine; 1,2-dimethylimidazole; 2-methyl imidazole; monocyclic and bicyclic amidines (German Offenlegungsschrift No. 1,720,633); bis-(dialkylamino)-alkyl ethers (U.S. Pat. No. 3,330,782, German Auslegeschrift No. 1,030,558, German Offenlegungsschriften Nos. 1,804,361 and 2,618,280); tertiary amines containing amide groups (preferably formamide groups) according to German Offenlegungsschriften Nos. 2,523,633 and 2,732,292. Other suitable catalysts are also Mannich bases of secondary amines (such as dimethylamine), aldehydes (preferably formaldehyde), ketones (such as acetone, methylethyl ketone and cyclohexanone) and phenols (such as phenol, nonyl phenol or bisphenol).

Tertiary amines containing isocyanate-reactive hydrogen atoms suitable for use as catalysts are triethanolamine, triisopropanolamine, N-methyldiethanolamine, N-ethyldiethanolamine, N,N-dimethylethanolamine, the reaction products thereof with alkylene oxides (such as propylene oxide and/or ethylene oxide), and also secondary-tertiary amines according to German Offenlegungsschrift No. 2,732,292.

Other suitable addition catalysts are silaamines containing carbon-silicon bonds of the type described in German Pat. No. 1,229,290 (corresponds to U.S. Pat. No. 3,620,984). Examples of these compounds are 2,2,4-trimethyl-2-silamorpholine and 1,3-diethylaminomethyl tetramethyl disiloxane.

Other catalysts which may be used in the present invention include: nitrogen-containing bases (such as tetraalkyl ammonium hydroxides), alkali metal hydroxides (such as sodium hydroxide), alkali metal phenolates (such as sodium phenolate) and alkali metal alcoholates (such as sodium methylate). Hexahydrotriazines may also be used as catalysts (German Offenlegungsschrift No. 1,769,043).

The reaction between NCO-groups and Zerewitinoff-active hydrogen atoms may also be greatly accelerated by use of lactams and azalactams which are believed to form a complex with the compound containing acid hydrogen. Such complexes and their catalytic effect are described in German Offenlegungsschrift Nos. 2,062,288; 2,062,289; 2,117,576 (U.S. Pat. No. 3,758,442); 2,129,198; 2,330,175 and 2,330,211.

Organo-tin compounds must not be used as catalyst in the present invention.

Additional catalysts which may be used in accordance with the present invention may be found in Kunststoff-Handbuch by Vieweg and Hochtlen, Vol. VII, Carl-Hanser-Verlag, Munich, 1966, for example on pages 96 to 102. The additional catalysts are generally used in a quantity of from about 0.001 to 10% by weight, (based on the total quantity of compounds containing at least two isocyanate-reactive hydrogen atoms).

Suitable foam stabilizers include polyether siloxanes, particularly water-soluble types. The structure of these compounds is generally such that a copolymer of ethylene oxide and propylene oxide is attached to a polymethyl siloxane residue. Such foam stabilizers are described in U.S. Pat. Nos. 2,834,748; 2,917,480 and 3,629,308. In many cases, polysiloxanepolyoxyalkylene copolymers branched through allophanate groups (German Offenlegungsschrift No. 2,558,523) are particularly advantageous.

Reaction retarders (e.g., acid-reacting substances such as hydrochloric acid or organic acid halides), cell regulators (such as paraffins or fatty alcohols or dimethyl polysiloxanes), pigments, dyes, known flame-proofing agents (for example trischloroethyl phosphate, tricresyl phosphate or ammonium phosphate and polyphosphate), stabilizers against the effects of ageing and weather, plasticizers, fungistatic and bacteriostatic substances, and fillers (such as barium sulphate, kieselguhr, carbon black or whiting) may also be used in the practice of the present invention.

Additional examples of surface-active additives, foam stabilizers, cell regulators, reaction retarders, stabilizers, flameproofing agents, plasticizers, dyes, fillers, fungistatic and bacteriostatic substances which may optionally be used in the present invention and information on the way in which these additives may be used may be found in Kunststoff-Handbuch, Vol. VII, by Vieweg and Hochtlen, Carl-Hanser-Verlag, Munich, 1966, for example on pages 103 to 113.

The process of the present invention may be carried out by techniques well known to those in the art. These known methods include reacting the starting materials by the one-shot process. Suitable apparatuses are described in U.S. Pat. No. 2,764,565. Particulars of processing machines may also be found in Kunststoff-Handbuch by Vieweg and Hochtlen, Vol. VII, Carl-Hanser-Verlag, Munich, 1966, for example on pages 121 to 205.

The isocyanate index used to produce the foams of the present invention can be varied over a wide range and generally is from 90 to 125 and is preferably from 105 to 125.

Foams may be made in accordance with the present invention by introducing the foamable reaction mixture into a closed mold. Suitable mold materials are metals (for example, aluminum) or plastics (for example, epoxide resin). The foamable reaction mixture foams in the mold and forms the molding. In-mold foaming may be carried out in such a way that the molding has either a cellular structure at its surface, or a compact skin and a cellular core. The foamable reaction mixture may be introduced into the mold in such a quantity that the foam formed just fills the mold. However, it is also possible to introduce more foamable reaction mixture than is required to fill the interior of the mold with foam. This latter technique is known as "overcharging" and is described in U.S. Pat. Nos. 3,178,490 and 3,182,104. In many cases, known "external release agents" (such as silicone oils) are used for in-mold foaming. However, it is also possible to use so-called "internal release agents", optionally in admixture with external release agents, of the type described in German Offenlegungsschriften Nos. 2,121,670 and 2,307,589.

According to the present invention, it is also possible to produce cold-hardening foams (cf. British Pat. No. 1,162,517 and German Offenlegungsschrift No. 2,153,086). Foams may also be produced by block foaming.

The products of the present invention may be used as upholstery material, cushioning, carpet underlay and mattresses.

Having thus described our invention, the following examples are given by way of illustration. All percentages and parts given in these examples are by weight unless otherwise indicated.

EXAMPLES

In the examples which follow, the following polyols were used:

(a) POLYOL A: a dispersion having an OH number of about 28 and consisting of a polyhydrazodicarbonamide in a glycerin initiated propylene oxide/ethylene oxide polyether with an OH number of 35, and produced by reacting toluene diisocyanate and hydrazine hydrate in the presence of the polyether, according to U.S. Pat. No. 4,042,537. The dispersion has a solids content of 20 percent by weight.

(b) POLYOL B: a blend of POLYOL A and a glycerin initiated propylene oxide/ethylene oxide polyether of OH number 28. The resultant blend has a solids content of 6 percent by weight and an OH number of about 28.

(c) POLYOL C: a blend of POLYOL A and a glycerin initiated propylene oxide/ethylene oxide polyether of OH number 28. The resultant blend has a solids content of 4 percent by weight and an OH number of about 28.

(d) POLYOL D: a blend of POLYOL A and a glycerin initiated propylene oxide/ethylene oxide polyether of OH number 28. The resultant blend has a solids content of 2 percent by weight and an OH number of about 28.

(e) POLYOL E: Niax 34-28: described in Table 1.

The following aromatic diamine addition products were used:

(a) ADDITION PRODUCT A: the reaction product of an 80:20 mixture of 2,4- and 2,6-toluene diamine, propylene oxide and ethylene oxide, having an OH number of about 470 and an average OH functionality of about 4.

(b) ADDITION PRODUCT B: the reaction product of 2,6-toluene diamine, propylene oxide and ethylene oxide, having an OH number of about 440 and an average OH functionality of about 4.

(c) ADDITION PRODUCT C: the reaction product of 2,6-toluene diamine, propylene glycol and propylene oxide having an OH number of about 370 and an average OH functionality of about 3.7.

(d) ADDITION PRODUCT D: the reaction product of 2,6-toluene diamine and ethylene oxide having an OH number of about 600 and an average OH functionality of about 4.

(e) ADDITION PRODUCT E: the reaction product of an 80:20 mixture of 2,4- and 2,6-toluene diamine, propylene glycol and propylene oxide, having an OH number of about 400 and an average OH functionality of about 3.7.

(f) ADDITION PRODUCT F: the reaction product of an 80:20 mixture of 2,4- and 2,6-toluene diamine, propylene glycol, water, propylene oxide and ethylene oxide, having an OH number of about 390 and an average OH functionality of about 3.7.

(g) ADDITION PRODUCT G: the reaction product of 4,4'-methylene bis(phenylamine), propylene glycol and propylene oxide having an OH number of about 510 and an average OH functionality of about 2.7.

The following alkanol amines were used:
(a) TEOA: triethanolamine.
(b) DIPA: 85% diisopropanolamine in water.
(c) BLEND: a 50/50 blend of TEOA and DIPA.

The following additional materials were used in the examples:

(a) ISO: an 80:20 mixture of 2,4- and 2,6-toluene diisocyanate.

(b) H$_2$O: water.

(c) P7750: Polycat 7750, a commercially available tertiary amine available from Abbott Labs.

(d) 33LV: Triethylene diamine (33%) in dipropylene glycol.

(e) L-5307: a commercially available organo-silicone available from Union Carbide.

(f) T-12: dibutyltindilaurate.

(g) DEOA-LF: an 85% solution of diethanolamine in water.

(h) T101: Thermolin 101 a commercially available flame retardant, available from Olin Chemical.

Polyurethane foams were then produced using one of the following procedures:

Procedure 1 (Hand Mix-HM)

Box pour foams (13"×13", free rise) were prepared for each example noted. The polyol, addition product, alkanol amine, water, catalyst and silicone surfactant were premixed for 15 seconds at 1500 RPM. The addition of the isocyanate was followed by a 5 second mix at 2000 RPM. The mixture was poured into a cardboard box. After allowing the foams to cure for 24 hours, a 11"×11"×3" pad was cut from the center of the bun and used for physical testing.

Procedure 2 (Machine Mix-UBT)

Production-scale runs were made on a Hennecke UBT-65 machine under the following conditions:

| Mixer type | Pin |
|---|---|
| Mixer speed, RPM | 3500 |
| Throughput, lb./min. | 110–120 |
| Polyol/TDI Temperature, °F. | 75/75 |

A 40"×100"×18" high bun was produced and allowed to cure for 24 hours prior to cutting. A cross-section 15" wide was cut from the center of the bun and used for physical property testing.

In the examples, the isocyanate indices were as indicated in the tables which follow. In the control experiments, the following formulations were used unless otherwise indicated in the tables which follow:

|  | PBW |
|---|---|
| POLYOL | 100 |
| ISO | varied to give index noted |
| H$_2$O | varied between 1.7 and 3.0 to give density noted |
| D7750 | 0.08 |
| 33LV | 0.12 |
| L-5307 | 1.0 |
| T-12 | 0.1 |
| DEOA-LF | 0.8 |
| T101 | 2.0 |

In the other examples wherein the alkanolamine and addition product were used, the following formulation was used unless otherwise indicated in the following tables:

|  | PBW |
|---|---|
| POLYOL | 100 |
| ISO | varied to give index noted |
| P7750 | 0.08 |
| T-12 | 0.12 |
| H$_2$O | varied between 2.2 and 3.2 to give density noted |
| L-5307 | 1.0 |
| DEOA-LF | 0.8 |
| ADDITION PRODUCT | varied as noted |
| ALKANOL AMINE | varied as noted |
| T101 | 2.0 |

All of the foams were tested for foam load bearing using ASTM D-3574-81 and the 25% Rest Indentations Force Deflection (25% RIFD) was recorded. Additionally, all foams were tested for density with the results recorded.

In the Tables which follow, under the heading PROCEDURE, HM denotes a hand-mix while UBT denotes a machine mix. Under the heading COMMENTS any changes from the above formulations were noted. Additionally, the following abbreviations were used to characterize the foams produced:

"SB": settle back-a processing defect between good processing and collapse.

"SHR": slight shrinkage

"SEV SHR": severe shrinkage
"GOOD FOAM": excellent processing

In the examples: Examples 1 through 18 and 159 represent comparative runs. Examples 19 through 158 and 160 through 184 relate to the use of ADDITION PRODUCT A. Examples 185 through 196 relate to the use of ADDITION PRODUCTS B through G.

TABLE 2

| EXAMPLE # | POLYOL | ISOCYANATE INDEX | PROCEDURE | DENSITY LB/FT | IFD | COMMENTS |
|---|---|---|---|---|---|---|
| 1 | B | 115 | HM | 1.89 | 31 | |
| 2 | B | 115 | HM | 1.90 | 29 | |
| 3 | B | 115 | HM | 2.05 | 27 | |
| 4 | B | 115 | UBT | 2.24 | 27 | |
| 5 | B | 115 | UBT | 2.32 | 35 | |
| 6 | B | 115 | UBT | 2.34 | 31 | |
| 7 | B | 115 | UBT | 2.42 | 31 | |
| 8 | B | 115 | HM | 2.43 | 37 | |
| 9 | B | 102 | UBT | 2.50 | 33 | |
| 10 | B | 111 | UBT | 2.52 | 30 | |
| 11 | B | 115 | HM | 2.52 | 28 | |
| 12 | B | 110 | HM | 2.56 | 24 | |
| 13 | B | 115 | UBT | 2.60 | 37 | Good Foam |
| 14 | B | 115 | UBT | 2.62 | 33 | Good Foam |
| 15 | B | 115 | HM | 2.76 | 18 | |
| 16 | B | 115 | HM | 2.92 | 31 | |
| 17 | B | 115 | HM | 3.12 | 29 | |
| 18 | E | 115 | HM | 2.95 | 61 | |

TABLE 3

| Example Number | Polyol | Parts Addition Product A | Type Alkanol Amine | PBW Alkanol Amine | Isocyanate Index | Procedure | Density | IFD | Comments |
|---|---|---|---|---|---|---|---|---|---|
| 19 | A | 13.7 | BLEND | 6.4 | 108 | UBT | 2.14 | 108 | |
| 20 | A | 13.7 | BLEND | 6.4 | 115 | UBT | 2.31 | 115 | |
| 21 | A | 10.3 | BLEND | 4.8 | 115 | UBT | 2.41 | 88 | |
| 22 | A | 13.7 | BLEND | 6.4 | 122 | HM | 2.50 | 109 | |
| 23 | A | 13.7 | BLEND | 6.4 | 115 | UBT | 2.52 | 137 | |
| 24 | A | 13.7 | BLEND | 6.4 | 115 | UBT | 2.52 | 150 | |
| 25 | A | 13.7 | BLEND | 6.4 | 115 | HM | 2.60 | 113 | |
| 26 | A | 13.7 | BLEND | 6.4 | 115 | HM | 2.80 | 135 | |
| 27 | A | 13.7 | BLEND | 6.4 | 115 | UBT | 2.95 | 156 | |
| 28 | A | 13.7 | BLEND | 6.4 | 122 | UBT | 2.95 | 176 | |
| 29 | A | 13.7 | BLEND | 6.4 | 115 | HM | 3.00 | 146 | |
| 30 | A | 10.3 | BLEND | 4.8 | 115 | UBT | 3.04 | 119 | |
| 31 | A | 13.7 | BLEND | 6.4 | 122 | HM | 3.09 | 153 | SB |
| 32 | A | 10.3 | BLEND | 4.8 | 115 | UBT | 3.11 | 127 | |
| 33 | A | 13.7 | BLEND | 6.4 | 122 | HM | 3.20 | 165 | |
| 34 | A | 13.7 | BLEND | 6.4 | 115 | HM | 3.36 | 189 | |
| 35 | A | 10.3 | BLEND | 4.8 | 115 | HM | 3.79 | 117 | |
| 36 | E | 13.7 | BLEND | 6.4 | 115 | HM | 3.14 | 175 | |
| 37 | B | 10.3 | BLEND | 4.8 | 115 | HM | 2.15 | 37 | SB SHR |
| 38 | B | 10.3 | BLEND | 4.8 | 115 | UBT | 2.24 | 45 | |
| 39 | B | 13.7 | BLEND | 6.4 | 115 | UBT | 2.24 | 54 | |
| 40 | B | 10.3 | BLEND | 4.8 | 122 | UBT | 2.26 | 52 | |
| 41 | B | 10.3 | BLEND | 4.8 | 105 | HM | 2.26 | 35 | SHR |
| 42 | B | 6 | BLEND | 6 | 115 | UBT | 2.28 | 41 | Good Foam |
| 43 | B | 10.3 | BLEND | 4.8 | 115 | UBT | 2.29 | 56 | 0.25 7750/33LV |
| 44 | B | 17 | — | — | 115 | HM | 2.30 | 65 | SEV SHR 1.5 DEOA-LF |
| 45 | B | 13 | — | — | 115 | HM | 2.31 | 47 | SHR 2.0 DEOA-LF |
| 46 | B | 10.3 | TEOA | 4.7 | 115 | UBT | 2.32 | 35 | SHR |
| 47 | B | 10.3 | BLEND | 4.8 | 115 | HM | 2.34 | 43 | SHR |
| 48 | B | 10.3 | BLEND | 4.8 | 105 | HM | 2.34 | 38 | SHR |
| 49 | B | 13.7 | TEOA | 6.3 | 115 | UBT | 2.35 | 62 | |
| 50 | B | 10.3 | BLEND | 4.8 | 107 | HM | 2.35 | 38 | SHR |
| 51 | B | 10.3 | BLEND | 4.8 | 122 | HM | 2.37 | 61 | |
| 52 | B | 6.8 | TEOA | 3.2 | 125 | HM | 2.42 | 27 | |
| 53 | B | 13.7 | BLEND | 6.4 | 115 | UBT | 2.42 | 57 | |
| 54 | B | 13.7 | BLEND | 6.4 | 122 | UBT | 2.43 | 70 | |
| 55 | B | 6.8 | TEOA | 3.2 | 115 | HM | 2.45 | 25 | |
| 56 | B | 10.3 | BLEND | 4.8 | 115 | HM | 2.45 | 50 | |
| 57 | B | 10.3 | BLEND | 4.8 | 122 | HM | 2.45 | 62 | |
| 58 | B | 5 | BLEND | 6 | 115 | HM | 2.48 | 38 | SHR |
| 59 | B | 13.7 | BLEND | 6.4 | 122 | HM | 2.49 | 76 | |
| 60 | B | 20 | — | — | 115 | HM | 2.50 | 80 | SEV SHR 1.5 DEOA-LF |
| 61 | B | 13.7 | TEOA | 6.3 | 125 | HM | 2.50 | 70 | |
| 62 | B | 15 | BLEND | 5.0 | 115 | HM | 2.50 | 69 | |
| 63 | B | 13 | BLEND | 6 | 115 | HM | 2.50 | 75 | |
| 64 | B | 13.7 | BLEND | 6.4 | 115 | HM | 2.51 | 67 | |
| 65 | B | 15 | — | — | 115 | HM | 2.52 | 66 | SEV SHR 1.5 DEOA-LF |
| 66 | B | 6 | — | — | 115 | HM | 2.52 | 38 | SB SHR 0.8 DEOA-LF |
| 67 | B | 10.3 | BLEND | 4.8 | 115 | HM | 2.53 | 55 | |
| 68 | B | 13 | BLEND | 6 | 115 | HM | 2.53 | 60 | |
| 69 | B | 6 | — | — | 115 | HM | 2.54 | 39 | SB SHR |

TABLE 3-continued

| Example Number | Polyol | Parts Addition Product A | Type Alkanol Amine | PBW Alkanol Amine | Isocyanate Index | Procedure | Density | IFD | Comments |
|---|---|---|---|---|---|---|---|---|---|
| 70 | B | 11.2 | BLEND | 3.8 | 122 | HM | 2.55 | 51 | 0.94 DEOA-LF |
| 71 | B | 15 | BLEND | 5.0 | 122 | HM | 2.57 | 88 | |
| 72 | B | 13 | BLEND | 6.0 | 122 | HM | 2.57 | 72 | |
| 73 | B | 5 | BLEND | 6.0 | 115 | HM | 2.58 | 44 | |
| 74 | B | 13 | BLEND | 6.0 | 115 | HM | 2.59 | 59 | SB |
| 75 | B | 6.8 | TEOA | 3.2 | 100 | HM | 2.60 | 23 | SHR |
| 76 | B | 13.3 | BLEND | 6.6 | 115 | HM | 2.60 | 56 | |
| 77 | B | 13.3 | BLEND | 6.6 | 115 | HM | 2.62 | 61 | Good Foam |
| 78 | B | 6 | — | — | 115 | HM | 2.63 | 40 | SB SHR 0.94 DEOA-LF |
| 79 | B | 8.2 | BLEND | 3.8 | 111 | UBT | 2.63 | 36 | |
| 80 | B | 13.7 | BLEND | 6.4 | 102 | UBT | 2.63 | 30 | |
| 81 | B | 13.7 | TEOA | 6.3 | 115 | HM | 2.64 | 62 | Good Foam |
| 82 | B | 10.3 | BLEND | 4.8 | 122 | HM | 2.64 | 56 | |
| 83 | B | 13.7 | TEOA | 6.3 | 115 | UBT | 2.65 | 65 | Good Foam |
| 84 | B | 13.7 | BLEND | 6.4 | 115 | HM | 2.65 | 63 | |
| 85 | B | 15 | BLEND | 5.0 | 115 | HM | 2.65 | 55 | |
| 86 | B | 10 | BLEND | 6.0 | 115 | HM | 2.66 | 57 | SB SHR |
| 87 | B | 5 | BLEND | 6 | 115 | HM | 2.66 | 38 | SB SHR |
| 88 | B | 15 | BLEND | 5.0 | 122 | HM | 2.66 | 65 | |
| 89 | B | 13.7 | TEOA | 6.3 | 100 | HM | 2.68 | 51 | Good Foam |
| 90 | B | 10.3 | BLEND | 4.8 | 115 | HM | 2.70 | 47 | SHR |
| 91 | B | 11.2 | BLEND | 3.8 | 115 | HM | 2.70 | 42 | SHR |
| 92 | B | 10.3 | DIPA | 4.7 | 115 | HM | 2.71 | 41 | SB |
| 93 | B | 13 | — | — | 115 | HM | 2.72 | 47 | SEV SHR 1.5 DEOA-LF |
| 94 | B | 6.7 | BLEND | 3.4 | 115 | HM | 2.72 | 40 | |
| 95 | B | 10.3 | BLEND | 4.8 | 115 | HM | 2.73 | 35 | SHR |
| 96 | B | 13.3 | BLEND | 6.6 | 125 | HM | 2.74 | 63 | |
| 97 | B | 13.7 | BLEND | 6.4 | 122 | HM | 2.74 | 75 | |
| 98 | B | 10 | — | — | 115 | HM | 2.75 | 41 | SHR 1.5 DEOA-LF |
| 99 | B | 13 | BLEND | 6 | 115 | HM | 2.76 | 64 | SB |
| 100 | B | 7 | BLEND | 6 | 115 | UBT | 2.77 | 60 | Good Foam |
| 101 | B | 7 | BLEND | 6 | 115 | HM | 2.77 | 55 | |
| 102 | B | 6.7 | BLEND | 3.4 | 115 | HM | 2.77 | 30 | SHR |
| 103 | B | 8.9 | BLEND | 4.2 | 111 | HM | 2.77 | 40 | |
| 104 | B | 5 | — | — | 115 | HM | 2.78 | 38 | 1.5 DEOA-LF |
| 105 | B | 6.7 | BLEND | 3.4 | 125 | HM | 2.78 | 33 | SB SHR |
| 106 | B | 6.7 | BLEND | 3.4 | 100 | HM | 2.80 | 28 | |
| 107 | B | 10.3 | TEOA | 4.7 | 115 | UBT | 2.81 | 53 | SHR |
| 108 | B | 10.3 | BLEND | 4.8 | 110 | UBT | 2.81 | 52 | |
| 109 | B | 10 | BLEND | 6 | 115 | HM | 2.83 | 58 | SB |
| 110 | B | 13.3 | BLEND | 6.6 | 115 | HM | 2.85 | 61 | Good Foam |
| 111 | B | 13.3 | BLEND | 6.6 | 100 | HM | 2.89 | 46 | Good Foam |
| 112 | B | 13.3 | BLEND | 6.6 | 125 | HM | 2.89 | 72 | Good Foam |
| 113 | B | 13.7 | BLEND | 6.4 | 122 | UBT | 2.89 | 78 | |
| 114 | B | 6.8 | TEOA | 3.2 | 115 | HM | 2.90 | 30 | SB |
| 115 | B | 7 | BLEND | 6 | 115 | HM | 2.91 | 53 | SB SHR |
| 116 | B | 10.3 | BLEND | 4.8 | 117 | UBT | 2.91 | 66 | |
| 117 | B | 13.7 | BLEND | 6.4 | 115 | UBT | 2.92 | 85 | |
| 118 | B | 5 | BLEND | 6 | 115 | HM | 2.93 | 42 | SB SHR |
| 119 | B | 13 | BLEND | 6 | 122 | HM | 2.94 | 80 | |
| 120 | B | 13 | BLEND | 6 | 115 | UBT | 2.95 | 90 | Good Foam |
| 121 | B | 7 | BLEND | 6 | 115 | HM | 2.97 | 63 | |
| 122 | B | 6.7 | BLEND | 3.4 | 115 | HM | 2.97 | 32 | SB SHR |
| 123 | B | 6.7 | BLEND | 3.4 | 115 | HM | 2.98 | 34 | |
| 124 | B | 10.3 | TEOA | 4.7 | 115 | HM | 3.00 | 58 | SB |
| 125 | B | 10.3 | BLEND | 4.8 | 122 | HM | 3.00 | 78 | |
| 126 | B | 13.7 | BLEND | 6.4 | 115 | HM | 3.00 | 90 | |
| 127 | B | 13 | BLEND | 6.0 | 115 | HM | 3.01 | 78 | |
| 128 | B | 8.9 | BLEND | 4.2 | 111 | HM | 3.01 | 40 | SHR |
| 129 | B | 10.3 | BLEND | 4.8 | 102 | UBT | 3.01 | 42 | |
| 130 | B | 5 | BLEND | 6 | 115 | HM | 3.02 | 40 | |
| 131 | B | 13 | BLEND | 6 | 122 | HM | 3.02 | 89 | |
| 132 | B | 13 | BLEND | 6 | 122 | HM | 3.02 | 92 | |
| 133 | B | 13.7 | BLEND | 6.4 | 122 | HM | 3.03 | 100 | |
| 134 | B | 10.3 | BLEND | 4.8 | 115 | HM | 3.03 | 64 | |
| 135 | B | 13.7 | BLEND | 6.4 | 115 | HM | 3.04 | 84 | |
| 136 | B | 13.7 | BLEND | 6.4 | 122 | HM | 3.05 | 102 | |
| 137 | B | 13 | — | — | 115 | HM | 3.07 | 49 | SEV SHR 1 DEOA-LF |
| 138 | B | 7 | BLEND | 6 | 115 | HM | 3.07 | 57 | SB SHR |
| 139 | B | 10 | BLEND | 3 | 115 | HM | 3.08 | 78 | SHR |
| 140 | B | 7 | BLEND | 6 | 115 | HM | 3.08 | 51 | |
| 141 | B | 8.2 | BLEND | 3.8 | 115 | HM | 3.08 | 44 | SHR |
| 142 | B | 13.7 | TEOA | 6.3 | 115 | HM | 3.10 | 80 | |
| 143 | B | 10.3 | BLEND | 4.8 | 115 | HM | 3.10 | 71 | |

TABLE 3-continued

| Example Number | Polyol | Parts Addition Product A | Type Alkanol Amine | PBW Alkanol Amine | Isocyanate Index | Procedure | Density | IFD | Comments |
|---|---|---|---|---|---|---|---|---|---|
| 144 | B | 13.7 | BLEND | 6.4 | 115 | HM | 3.10 | 100 | |
| 145 | B | 6.7 | BLEND | 3.4 | 115 | HM | 3.12 | 30 | |
| 146 | B | 10.3 | BLEND | 4.8 | 124 | UBT | 3.12 | 85 | SHR |
| 147 | B | 13 | BLEND | 5 | 115 | HM | 3.13 | 90 | SHR |
| 148 | B | 13 | BLEND | 6 | 115 | HM | 3.13 | 77 | SB SHR |
| 149 | B | 10 | BLEND | 6 | 115 | HM | 3.15 | 61 | SB SHR |
| 150 | B | 13 | BLEND | 6 | 115 | HM | 3.15 | 72 | SB SHR |
| 151 | B | 10 | BLEND | 6 | 115 | HM | 3.15 | 58 | |
| 152 | B | 6.7 | BLEND | 3.4 | 125 | HM | 3.15 | 35 | SHR |
| 153 | B | 13 | BLEND | 6 | 115 | HM | 3.16 | 86 | |
| 154 | B | 7 | BLEND | 6 | 115 | HM | 3.20 | 55 | SB SHR |
| 155 | B | 6.8 | TEOA | 3.2 | 115 | HM | 3.20 | 42 | SB |
| 156 | B | 8.9 | BLEND | 4.2 | 122 | HM | 3.20 | 44 | SHR |
| 157 | B | 5 | BLEND | 6 | 115 | HM | 3.23 | 46 | |
| 158 | B | 13 | BLEND | 6 | 115 | HM | 3.24 | 59 | SB SHR |
| 159 | B | 3.4 | DIPA | 1.6 | 115 | HM | 3.25 | 28 | SB |
| 160 | B | 13 | BLEND | 5 | 115 | HM | 3.26 | 90 | SHR |
| 161 | B | 10 | BLEND | 6 | 115 | HM | 3.27 | 94 | SHR |
| 162 | B | 13 | BLEND | 6 | 115 | HM | 3.28 | 80 | SB SHR |
| 163 | B | 13 | BLEND | 6 | 115 | HM | 3.28 | 71 | Good Foam |
| 164 | B | 8.9 | BLEND | 4.2 | 115 | HM | 3.30 | 46 | SHR |
| 165 | B | 6.7 | BLEND | 3.4 | 100 | HM | 3.40 | 32 | |
| 166 | B | 7 | BLEND | 4 | 115 | HM | 3.40 | 40 | SB SHR |
| 167 | B | 13 | BLEND | 3 | 115 | HM | 3.47 | 68 | SB |
| 168 | B | 13 | BLEND | 6 | 115 | HM | 3.47 | 86 | SB |
| 169 | B | 6.7 | BLEND | 3.4 | 115 | HM | 3.47 | 35 | SB |
| 170 | B | 13 | BLEND | 2 | 115 | HM | 3.57 | 56 | SB |
| 171 | C | 13.7 | BLEND | 6.4 | 122 | HM | 2.60 | 117 | |
| 172 | C | 13.7 | BLEND | 6.4 | 115 | HM | 2.62 | 111 | |
| 173 | C | 13.7 | BLEND | 6.4 | 115 | HM | 2.70 | 115 | |
| 174 | C | 13.7 | BLEND | 6.4 | 122 | HM | 2.70 | 125 | |
| 175 | C | 13.7 | BLEND | 6.4 | 115 | HM | 3.07 | 140 | |
| 176 | C | 13.7 | BLEND | 6.4 | 122 | HM | 3.10 | 152 | |
| 177 | C | 13.7 | BLEND | 6.4 | 122 | HM | 3.20 | 158 | |
| 178 | C | 13.7 | BLEND | 6.4 | 115 | HM | 3.30 | 157 | |
| 179 | C | 13.7 | BLEND | 6.4 | 122 | HM | 3.39 | 137 | |
| 180 | C | 13.7 | BLEND | 6.4 | 115 | HM | 3.51 | 150 | |
| 181 | D | 13.7 | BLEND | 6.4 | 115 | HM | 2.47 | 109 | |
| 182 | D | 13.7 | BLEND | 6.4 | 122 | HM | 2.53 | 107 | |
| 183 | D | 13.7 | BLEND | 6.4 | 122 | HM | 2.96 | 138 | |
| 184 | D | 13.7 | BLEND | 6.4 | 115 | HM | 3.04 | 144 | |

TABLE 4

| Example Number | Polyol | Addition Product, PBW | Type Alkanol Amine | PBW Alkanol Amine | Isocyanate Index | Procedure | Density | IFD | Comments |
|---|---|---|---|---|---|---|---|---|---|
| 185 | B | B, 13.7 | BLEND | 6.4 | 115 | HM | 2.70 | 79 | SHR |
| 186 | B | B, 10.3 | BLEND | 4.8 | 115 | HM | 2.80 | 57 | SHR |
| 187 | B | C, 10.3 | BLEND | 4.8 | 115 | HM | 3.10 | 46 | SHR |
| 188 | B | C, 13.7 | BLEND | 6.4 | 115 | HM | 3.10 | 76 | SHR |
| 189 | B | D, 10.3 | BLEND | 4.8 | 115 | HM | 3.20 | 67 | Good Foam |
| 190 | B | D, 13.7 | BLEND | 6.4 | 115 | HM | 3.50 | 83 | Good Foam |
| 191 | B | E, 13.7 | BLEND | 6.4 | 115 | HM | 2.90 | 74 | SB SHR |
| 192 | B | E, 10.3 | BLEND | 4.8 | 115 | HM | 3.20 | 49 | SB SHR |
| 193 | B | F, 10.3 | BLEND | 4.8 | 115 | HM | 3.50 | 95 | SB |
| 194 | B | F, 13.7 | BLEND | 6.4 | 115 | HM | 3.60 | 148 | SB |
| 195 | B | G, 13.7 | BLEND | 6.4 | 115 | HM | 3.00 | 89 | SB SHR |
| 196 | B | G, 10.3 | BLEND | 4.8 | 115 | HM | 3.30 | 69 | SB SHR |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of a flexible polyurethane foam comprising reacting an organic polyisocyanate and a polyol, in the presence of a blowing agent, a catalyst, and a foam stabilizer, the improvement wherein a foam of increased load bearing is obtained by including in the reaction mixture from about 8 to about 25 parts by weight per 100 parts by weight of said polyol of a mixture comprising (a) from 30 to 100 percent by weight of an addition product of an alkylene oxide and an aromatic diamine, said addition product having an average hydroxyl functionality of at least 2.5 and as high as 6, and having an hydroxyl number of from about 150 to about 810 and containing no free amine hydrogens, and (b) from 0 to 70 percent by weight of an alkanolamine having at least one hydroxyl group and having at least two active hydrogens, the hydroxyl number of the combination of said polyol, said mixture, and any other isocyanate-reactive components, excluding water, being from 25 to 200, said process further being characterized as being conducted in the absence of a tin catalyst.

2. The process of claim 1 wherein the hydroxyl number of said combination is from about 60 to about 160.

3. The process of claim 1 wherein said mixture is added in an amount of from about 10 to about 20 parts by weight per 100 parts by weight of said polyol.

4. The process of claim 1 wherein said addition product has an average hydroxyl functionality of from 2.5 to 4 and an hydroxyl number of from about 350 to about 600.

5. The process of claim 1 wherein the weight ratio of (a) to (b) is from 10:1 to 1:2.

6. The process of claim 5 wherein the weight ratio of (a) to (b) is from 5:1 to 1:1.

7. A mixture comprising
(a) an addition product of an alkylene oxide and an aromatic diamine, said addition product having an average hydroxyl functionality of from 2.5 to 4, and having an hydroxyl number of from about 150 to about 810 and containing no free amine hydrogens, and
(b) an alkanolamine having at least one hydroxyl group and having at least two active hydrogens, the weight ratio of component (a) to component (b) being 10:1 to 1:2.

8. The mixture of claim 7 wherein the weight ratio is from 5:1 to 1:1.

9. The mixture of claim 7 wherein said addition product has an hydroxyl number of from about 350 to about 600.

10. A blend comprising
(a) an organic polyol,
(b) from 30 to 100 percent by weight of an addition product of an alkylene oxide and an aromatic diamine, said addition product having an average hydroxyl functionality of at least 2.5 and as high as 6, and having an hydroxyl number of from about 150 to about 810 and containing no free amine hydrogens, and
(c) from 0 to 70 percent by weight of an alkanolamine having at least one hydroxyl group and having at least two active hydrogens, the hydroxyl number of the combination of said polyol, said mixture and any other isocyanate-reactive components, excluding water, being from 25 to 200.

11. The blend of claim 10, wherein the hydroxyl number of said blend is from about 60 to 160.

* * * * *